United States Patent
Fröjdh et al.

(10) Patent No.: US 10,397,595 B2
(45) Date of Patent: *Aug. 27, 2019

(54) PROVISION OF SUPPLEMENTAL PROCESSING INFORMATION

(71) Applicant: Telefonaktiebolaget LM Ericsson (publ), Stockholm (SE)

(72) Inventors: Per Fröjdh, Stockholm (SE); Clinton Priddle, Carindale (AU); Zhuangfei Wu, Danderyd (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/102,404

(22) Filed: Aug. 13, 2018

(65) Prior Publication Data

US 2018/0352244 A1 Dec. 6, 2018

Related U.S. Application Data

(63) Continuation of application No. 15/469,669, filed on Mar. 27, 2017, now Pat. No. 10,085,036, which is a
(Continued)

(51) Int. Cl.
*H04N 19/46* (2014.01)
*H04N 19/85* (2014.01)
(Continued)

(52) U.S. Cl.
CPC .......... *H04N 19/46* (2014.11); *H04N 19/44* (2014.11); *H04N 19/597* (2014.11);
(Continued)

(58) Field of Classification Search
USPC ............... 386/239–248, 326–342, 353–357
See application file for complete search history.

(56) References Cited

U.S. PATENT DOCUMENTS

2005/0232501 A1 10/2005 Mukerjee
2008/0109853 A1 5/2008 Einarsson et al.
(Continued)

FOREIGN PATENT DOCUMENTS

CN 1753097 A 3/2006
EP 1524859 A2 4/2015
(Continued)

OTHER PUBLICATIONS

International Telecommunication Union, "Advanced video coding for generic audiovisual services", Series H: Audiovisual and Multimedia Systems Infrastructure of audiovisual services—Coding of moving video, Mar. 2009, pp. 1-670.
(Continued)

*Primary Examiner* — Hung Q Dang
(74) *Attorney, Agent, or Firm* — Coats & Bennett, PLLC

(57) ABSTRACT

Supplemental processing information defining post-decoding instructions for processing decoded media content is co-organized in a file together with a pseudo-identifier of a media codec employed for encoding the media content. The co-organization trigger abortion of decoding of the media content by a legacy media terminal that does not recognize the pseudo-identifier but enables decoding of the media content by a media terminal that recognizes the pseudo-identifier to thereby enable post-decoding processing of the decoded media content using the supplemental processing information. The co-organization thereby prevents legacy media terminals that cannot use the supplemental processing information from decoding the media content and rendering the media content in a media presentation.

28 Claims, 6 Drawing Sheets

Related U.S. Application Data continuation of application No. 13/502,242, filed as application No. PCT/SE2010/051119 on Oct. 18, 2010, now Pat. No. 9,609,368.

(60) Provisional application No. 61/253,128, filed on Oct. 20, 2009.

(51) Int. Cl.

| | |
|---|---|
| *H04N 19/44* | (2014.01) |
| *H04N 19/70* | (2014.01) |
| *H04N 19/597* | (2014.01) |
| *H04N 21/235* | (2011.01) |
| *H04N 21/854* | (2011.01) |
| *H04N 21/435* | (2011.01) |
| *H04N 21/845* | (2011.01) |

(52) U.S. Cl.
CPC ............. *H04N 19/70* (2014.11); *H04N 19/85* (2014.11); *H04N 21/235* (2013.01); *H04N 21/2353* (2013.01); *H04N 21/435* (2013.01); *H04N 21/8451* (2013.01); *H04N 21/85406* (2013.01)

(56) References Cited

U.S. PATENT DOCUMENTS

| | | |
|---|---|---|
| 2009/0041339 A1 | 2/2009 | Yamada et al. |
| 2009/0055417 A1 | 2/2009 | Hannuksela |
| 2009/0066783 A1 | 3/2009 | Lee et al. |
| 2009/0158398 A1 | 6/2009 | Pandey et al. |
| 2009/0199100 A1 | 8/2009 | Hwang et al. |
| 2011/0090306 A1 | 4/2011 | Suh et al. |
| 2012/0092453 A1 | 4/2012 | Suh |

FOREIGN PATENT DOCUMENTS

| | | |
|---|---|---|
| JP | 2005094145 A | 4/2005 |
| JP | 2005167584 A | 6/2005 |
| RU | 2005111002 A | 10/2006 |

OTHER PUBLICATIONS

ISO/IEC, "Information technology—Coding of audio-visual objects—Part 12: ISO base media file format", International Standard ISO/IEC 14496-12, Oct. 15, 2008, pp. 1-120, Third Edition.

ISO/IEC, "Information technology—Coding of audio-visual objects—Part 14: MP4 file format", International Standard ISO/IEC 14496-14, Nov. 15, 2008, pp. 1-18, First Edition.

3rd Generation Partnership Project, Technical Specification Group Services and System Aspects Transparent end-to-end packet switched streaming service (PSS); 3GPP file format (3GP)(Release 8), 3GPP TS 26.244 V8.1.0, Jun. 2009, pp. 1-52.

Schulzrinne, H. et al., "RTP: A Transport Protocol for Real-Time Applications", Network Working Group Request for Comments: 1889, Category: Standards Track, Jan. 1996, pp. 1-71.

Wenger, S. et al., "RTP Payload Format for H.264 Video", Network Working Group Request for Comments: 3984, Category: Standards Track, Feb. 2005, pp. 1-84.

Sullivan, G. et al., "Joint Draft 2.0 of Amendment to ITU-T Rec. H.264 / ISO-IEC 14496-10: Constrained Baseline Profile and supplemental enhancement information", Joint Video Team (JVT) of ISO/IEC MPEG & ITU-T VCEG (ISO/IEC JTC1/SC29/WG11 and ITU-T SG16 Q.6) 30th Meeting, Jan. 29-Feb. 2, 2009, pp. 1-12.

ISO/IEC, "Information technology—Multimedia application format (MPEG.A)—Part 11: Stereoscopic video application format", International Standard, ISO/IEC FDIC 23000-11:2009(E), ISO/IEC JTC 1/SC 29, Jan. 30, 2009, pp. 1-28.

International Organization for Standardization, "Text of ISO/IEC 14496-12:2008 | 15444-12:2008 (3rd edition) / Amendment 2: Support for sub-track selection & switching, post-decoder requirements, and color information", Coding of moving pictures and audio, Jan. 1, 2010, pp. 1-24, ISO/IEC JTC1/SC29/WG11, MPEG/N11137, Kyoto, Japan.

International Organization for Standardization, "Information Technology—Coding of Audio-visual objects—Part 15: Advanced Video Coding (AVC) file format, Amendment 2: File Formal Support for Scalable Video Coding", ISO/IEC JTC 1/SC 29/ WG11, Mar. 10, 2008, pp. 1-44, ISO/IEC 14496-15:2004/FDAM 2:2008(E).

Tourapis, A., et al., "Format Extensions to the Spatially Interleaved Pictures SEI message", Joint Video Team (JVT) of ISO/IEC MPEG & ITU-T VCEG (ISO/IEC JTC1/SC29/WG11 and ITU-T SG16 Q.6), Jan. 29, 2009, pp. 1-10, 30th Meeting, Geneva, CH, Document: JVT-AD022.

Sullivan, G., et al., "Joint Draft 2.0 of Amendment to ITuOT Rec. H.264/ ISO/IEC 14496-10: Constrained Baseline Profile and Supplemental Enhancement information", Joint Video Team (JVT) of ISO/IEC MPEG & ITU-T VCEG (ISO/IEC JTC1/SC29/WG11 and ITU-T SG16 Q.6), Jan. 29, 2009, 30th Meeting, Geneva, CH, Document: JVT-AD204.

TDVision Systems, Inc., "Enabling 3D HD video for massive adoption providing 2D compatibility.", TDV Codec, Aug. 1, 2008, pp. 1-14, Version 2.3, TDVision Systems, Inc.

Per Frojdh, et al., "File format video 1-15 requirements", Coding of moving pictures and audio, ISO/IEC JTC1/SC29/WG 11, MPEG2009/M16979, Oct. 1, 2009, pp. 1-6, International Organization for Standardization, Xian, China.

PROVISION OF SUPPLEMENTAL PROCESSING INFORMATION

RELATED APPLICATIONS

The present application is a continuation of U.S. patent application Ser. No. 15/469,669, which was filed on Mar. 27, 2017, which is a continuation of U.S. patent application Ser. No. 13/502,242, which was filed on Apr. 16, 2012, which issued as U.S. Pat. No. 9,609,368 on Mar. 28, 2017, which is a national stage application of PCT/SE2010/051119, filed Oct. 18, 2010, and claims benefit of U.S. Provisional Application 61/253,128, filed Oct. 20, 2009, the disclosures of each of which are incorporated herein by reference in their entirety.

TECHNICAL FIELD

The embodiments generally relate to media content processing, and in particular to providing supplemental processing information useful in connection with media content processing.

BACKGROUND

H.264/MPEG-4 Part 10 or Advanced Video Coding (AVC) is the state of the art video coding standard. It is a hybrid codec which takes advantages of eliminating redundancy between frames and within one frame. The output of the encoding process is Video Coding Layer (VCL) data which is further encapsulated into Network Abstraction Layer (NAL) unit prior to transmission or storage.

Supplemental Enhancement Information (SEI) is provided to help in processes related to post-decoding, such as display. Examples of SEI messages include defining post-filter hints and tone mapping. The SEI messages are designed in such a way that they are not mandatory for the decoding process. Conforming decoders can discard SEI messages they do not understand. SEI messages are today encapsulated into a NAL unit just like VCL data, but do not affect decoding.

According to the prior art, a file must be made with specific knowledge of the media terminals display capabilities to guarantee correct playback. New display features added through enhancement information, i.e. outside the decoding loop, cannot be done in a backwards compatible manner. An example of this is the spatially interleaved frames SEI messages that have been added to H.264 video to assist in rendering decoded pictures on three-dimensional (3D) display devices. These SEI messages are derived from the effort of using an existing two-dimensional (2D) codec, such as H.264, to code 3D content. An example of this is where an SEI message describes that even frames are allocated to the left view and odd frame are allocated to the right view.

SEI messages are designed in a discardable way when it comes to decoding. It is important, however, that the media terminal can correctly interpret this information for things outside decoding, such as 3D rendering. A legacy media terminal that does not have the capability to understand these SEI messages would simply ignore them and render the decoded pictures on a 2D display resulting in significant display artifacts, e.g. hopping between left and right views every frame, for the above presented example.

Furthermore, today a media terminal needs to decode the video bit stream in order to find out whether and which types of enhancement information is necessary. It is problematic for both local playback and transmission. For example, one may have a movie that is not fully displayable and the media terminal will only find out that it cannot correctly display it when it gets to the unknown SEI message. In another case, when it comes to media transmission, a simple and quick method of thinning a bit stream is to remove all SEI messages as these are not required for decoding. This can lead to thinning of SEI messages which are important for rendering.

There is, thus, a general need within the technical field of efficiently handling supplemental processing information, such as SEI data, in order to solve or at least mitigate the problems of the prior art.

SUMMARY

It is a general objective to enable provision of supplemental processing information in an efficient way.

This and other objectives are met by embodiments disclosed herein.

Briefly, an aspect of the embodiments relates to a method of providing supplemental processing information relating to or associated with encoded media content. The method involves providing a pseudo-identifier of the media codec employed for encoding the media content. Supplemental processing information is also provided. The supplemental processing information defines post-decoding instructions for processing decoded media content obtainable by decoding the encoded media content. The pseudo-identifier and the supplemental processing information are co-organized in a file in order to trigger abortion of decoding of the encoded media content by a legacy media terminal that does not recognize the pseudo-identifier. Correspondingly, the co-organization of the pseudo-identifier and the supplemental processing information in the file enables decoding of the media content using the media codec and enables post-decoding processing of the decoded media content using the supplemental processing information by a media terminal that recognizes the pseudo-identifier.

Another aspect relates to a device for providing supplemental processing information. The device comprises an identifier provider for providing the pseudo-identifier of the media codec. An information provider is implemented in the device to provide the supplemental processing information defining the post-decoding instructions. The device also comprises a file organizer for co-organizing the pseudo-identifier and the supplemental processing information in a file in such a way to trigger abortion of decoding of the encoded media content by a legacy media terminal that does not recognize the pseudo-identifier. A media terminal that recognizes the pseudo-identifier will, however, be able to decode the encoded media content using the media codec and further process the media content following decoding based on the supplemental processing information.

A further aspect of the embodiments relates to a method of processing media content. The method involves receiving a file comprising the pseudo-identifier and the supplemental processing information. If the pseudo-identifier retrieved from the file is not recognized, decoding of the encoded media content is aborted so that the media content will not be presented to a user. However, if the pseudo-identifier is recognized, a media codec to use for decoding the encoded media content is selected based on a codec identifier of the media codec retrieved based on the pseudo-identifier. The encoded media content is then decoded using the selected media codec. Supplemental processing information retrieved from the file is employed for processing the decoded media content to get the media content in a form suitable for rendering to provide a media presentation for the user.

A media terminal is disclosed as a further aspect of the embodiments. The media terminal comprises a receiver for receiving the file with the pseudo-identifier and the supplemental processing information. A decoding controller of the media terminal is configured to investigate the pseudo-identifier and determine whether the pseudo-identifier is recognizable by the media terminal or not. If the pseudo-identifier is not recognized, the decoding controller controls a decoder to abort or stop decoding of the encoded media content. If the pseudo-identifier instead is recognized the decoding controller selects a media codec to employ for decoding the encoded media content based on a codec identifier retrieved based on the pseudo-identifier. The decoder is then configured to decode the encoded media content using the selected media codec to produce decoded media content. This decoded media content is processed by a content processor based on the supplemental processing information retrieved from the file to get the media content in a form suitable for rendering.

The embodiments therefore provide an efficient way of providing supplemental processing information that is to be used in connection with post-decoding processing of media content to get the media content in a form that enables correct rendering and presentation to a user. Legacy media terminals that do not understand and therefore cannot use the supplemental processing information are prevented from rendering the media content without any post-decoding processing by instead aborting the decoding. The abortion of the decoding is triggered by usage of a pseudo-identifier instead of the true codec identifier as media codec identifier. The legacy media terminals are therefore refrained from rendering the media content. This is important since the rendering would otherwise lead to visual and/or audio artifacts perceivable by a user since no post-decoding processing of the media content using the supplemental processing information was conducted by the legacy media terminals lacking the capability to use the supplemental processing information.

BRIEF DESCRIPTION OF THE DRAWINGS

The invention, together with further objects and advantages thereof, may best be understood by making reference to the following description taken together with the accompanying drawings, in which:

FIG. 3 is a flow diagram illustrating an embodiment of the co-organizing step in FIG. 1;

FIG. 10 is a flow diagram of additional steps of the method in FIG. 9 according to an embodiment;

FIG. 13 is a flow diagram illustrating another embodiment of the co-organizing step in FIG. 1.

DETAILED DESCRIPTION

Figure 1:
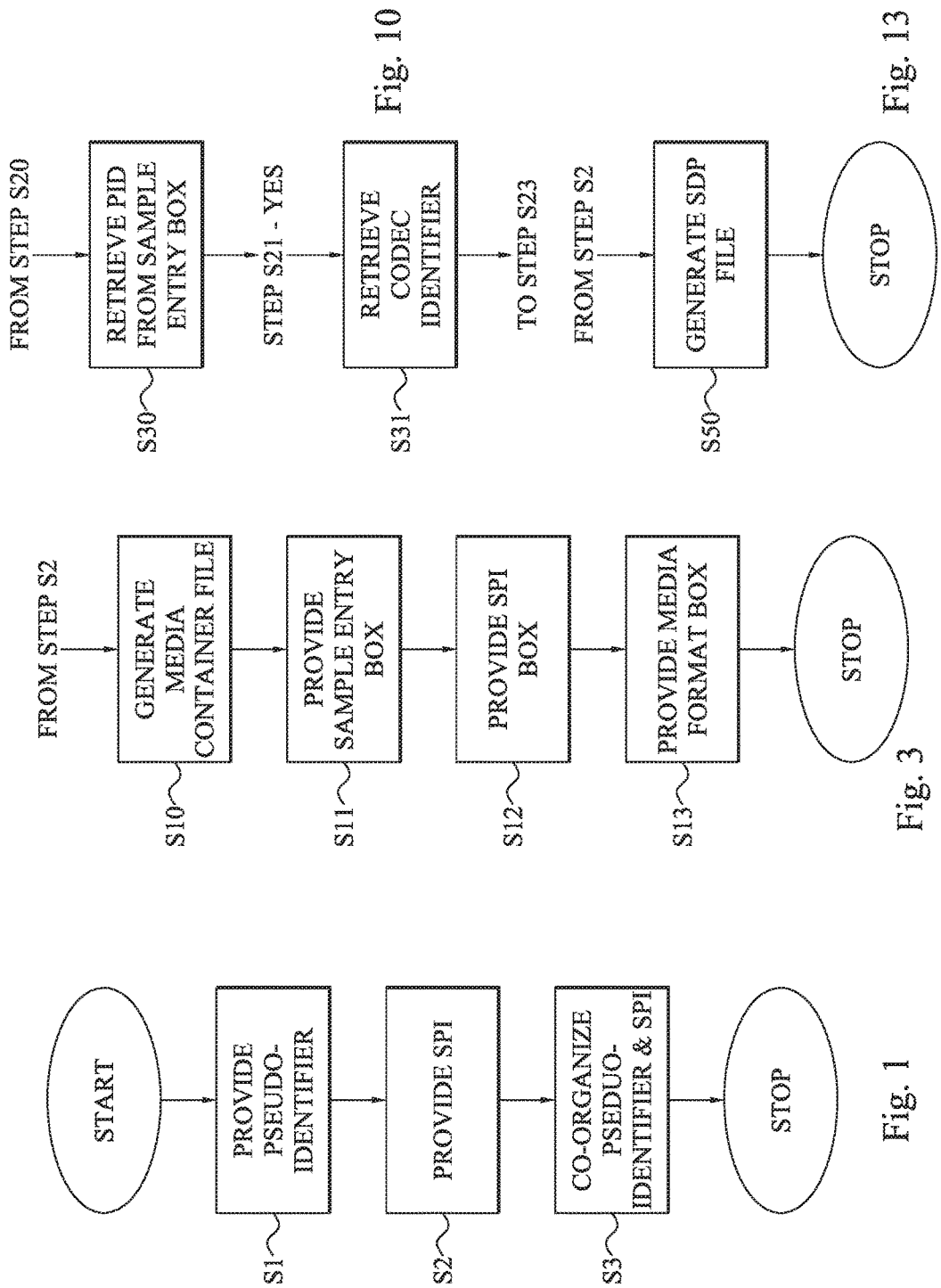
FIG. 1 is a flow diagram illustrating a method of providing supplemental processing information according to an embodiment.

Throughout the drawings, the same reference numbers are used for similar or corresponding elements.

The embodiments generally relate to media content processing and in particular to the provision and usage of supplemental processing information that can be employed by media terminals and players for processing and/or rendering decoded media content.

The embodiments provide efficient ways of communicating such supplemental processing information to media terminals. The communication of the supplemental processing information allows media terminals that recognize the supplemental processing information to retrieve it and use it for processing the media content prior to or during rendering. However, the supplemental processing information is advantageously communicated in such a way that legacy media terminals that do not recognize the supplemental processing information will not render the media content. This is preferred since such a media content rendering would lead to visual and/or audio artifacts perceived by the user as no post-decoding processing based on any supplemental processing information was conducted by the legacy media terminals.

Supplemental processing information (SPI) or supplemental enhancement information (SEI) as it is also denoted in the art defines post-decoding instructions that can be used by media terminals and players for processing decoded media content to which the supplemental processing information is associated. These post-decoding instructions can therefore provide information and instructions to the media terminals how they should process the data in order to provide a correct rendering of the media content during a media session. The supplemental processing information could be mandatory for the media terminals in terms of omitting the processing of the decoded media content based on the supplemental processing information prevents the media terminal from rendering the media content or the media terminal can render the media content but the resulting media presentation will have several more or less severe visual and/or audio artifacts, which will be perceived by the user. Supplemental processing information can also be optional in terms of not being required to render the media content but will enhance the rendering, perhaps by increasing the visual and/or audio effects of the media presentation or by facilitating seeking operations in the media presentation.

For instance, AVC specifies SEI messages that can be used to improve decoding and rendering of the VCL of an AVC bit stream. This information is designed in such a way that it is not mandatory for the decoding process, i.e. SEI contains information that is not necessary to decode the VCL and can be discarded by conforming decoders.

Although SEI is not crucial for the decoding process, it may specify required actions for the subsequent rendering process. One example is the stereo video information SEI message which indicates that the coded frames/fields of the video sequence consists of pairs of pictures forming stereo-view content. A more recent example is the spatially interleaved frames "checkerboard" SEI message. It informs the decoder that the output decoded picture contains samples of a frame consisting of multiple distinct spatially interleaved frames and how to appropriately de-interleave the samples for display purposes.

If a legacy media terminal tries to decode and render an AVC bit stream containing these SEI messages without understanding their meaning, it will discard them and decode the bit stream without knowing that the decoded pictures make no sense without further de-interleaving. Directly output to a 2D display, the result will be full of artifacts and certainly not what the content provider intended.

The AVC file format defines storage of AVC in file formats based on the ISO base media file format, such as MP4 and 3GP. The AVC bit streams contained in such files may include SEI messages, which may be useful for the decoding process. However, there are no constraints on the types of SEI messages that can be included and there is currently no signaling mechanism that informs the player that the AVC bit stream may contain SEI that is required for proper rendering of the decoded data. Even if the player parses the AVC bit stream and looks for SEI messages, it cannot tell whether any of the detected SEI messages impose actions outside the decoding loop unless it recognizes them and their meaning. Discarding seemingly harmless but unknown SEI can thus lead to unexpected results. Consequently, a file must according to the prior art be made with specific knowledge of the terminals display capabilities to guarantee correct playback. New display features added through supplemental processing information, such as SEI messages outside the decoding loop, cannot today be done in a backwards compatible manner.

Media content as disclosed herein relates to media data that can be communicated to a media terminal for decoding and rendering therein to provide a media presentation to a user. Media content can therefore be video content or data that is played and presented on a display screen. Alternatively, or in addition, media content can be audio content or data that is played back and can be listened to by a user using a loudspeaker.

FIG. 1 is a flow diagram of a method of providing supplemental processing information relating to encoded media content according to an embodiment. The method starts in step S1 where a pseudo-identifier of a media codec is provided. The media codec defines the media encoder employed for encoding the relevant media content. Step S1 provides a pseudo-identifier instead of the true codec identifier of the media codec. Pseudo-identifier should be interpreted herein as an alias for the codec identifier. The pseudo-identifier is further selected to be recognizable and can be interpreted by some media terminals but is not recognized and cannot be interpreted by other media terminals, denoted legacy media terminals herein.

A next step S2 provides supplemental processing information, abbreviated into SPI in the figures. The supplemental processing information defines post-decoding instructions for processing decoded media content obtainable by decoding the encoded media content associated with the supplemental processing information.

The pseudo-identifier and the supplemental processing information are co-organized in step S3 in a file in such a way to trigger abortion of decoding or prevent decoding of the encoded media content by a legacy media terminal that does not recognize the pseudo-identifier. Thus, the pseudo-identifier preferably triggers the legacy media terminal to abort the decoding of the media content and thereby not render any media content. However, the co-organization in the file is further conducted in such a way that it enables a media terminal that recognizes the pseudo-identifier to decode the encoded media content using the media decoder defined by the media codec and to post-decoding process the decoded media content using the supplemental processing information.

Thus, the co-organization of the pseudo-identifier and the supplemental processing information in the file in step S1 will prevent a legacy media terminal from decoding the encoded media content or trigger the media terminal to abort decoding of the encoded media content when it retrieves the pseudo-identifier. The reason for this is that the legacy media terminal does not recognize and can therefore not use the supplemental processing information. This means that even though the legacy media terminal can decode the encoded media content, it cannot correctly perform the post-decoding processing of the decoded media content using the supplemental processing information. This will lead to problems, which the embodiments solve by using the pseudo-identifier to trigger an abortion of the decoding before rendering can be initiated at the legacy media terminal.

Figure 2:
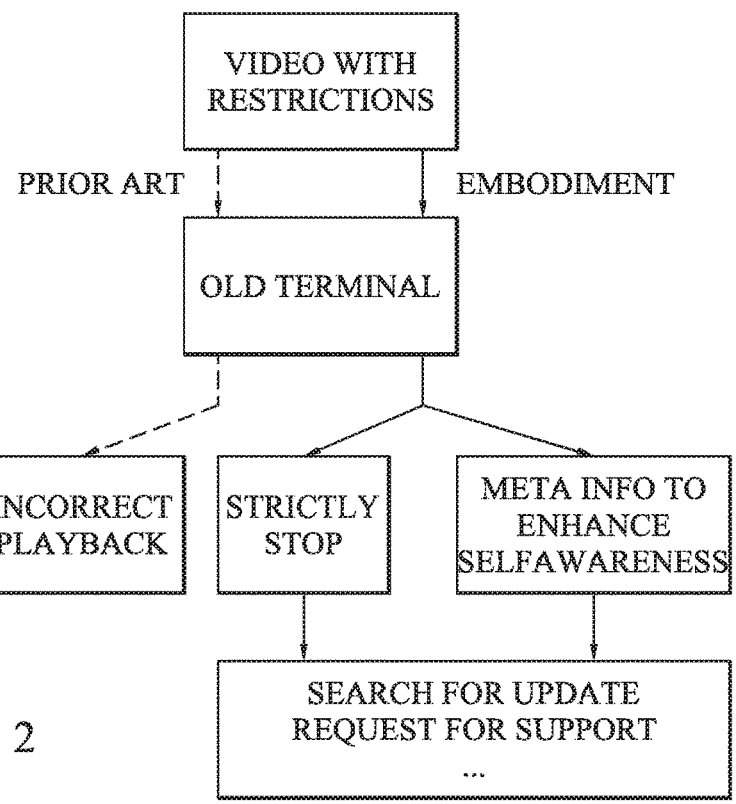
FIG. 2 is a comparison of media content processing according to prior art and according to an embodiment.

FIG. 2 schematically illustrates this concept. In this illustrative example video content is provided with restrictions in terms of requiring supplemental processing information in order to enable a correct rendering and display of the video data to the user. For instance, the supplemental processing information could define which video frames of the encoded video data or content that corresponds to a left view and which video frames that correspond to a right view for stereo or 3D rendering. The supplemental information could then define that every odd frame of the video content represents a first (left or right) view, whereas every even frame of the video content represents the second (right or left) view. According to the prior art, an old terminal, i.e. legacy media terminal, will correctly decode the encoded media content. However, since it does not recognize the supplemental processing information, it will simply ignore the information. This will result in an incorrect playback or rendering of the video content with hopping between left and right views every frame since the legacy media terminal is not aware of the particular interleaving of video frames of different views. The media presentation will therefore be highly unattractive to a viewing user and will be full of visual artifacts due to the view hopping at every frame.

In the prior art, decoding and media rendering is conducted in the legacy media terminals even though the legacy media terminals do not recognize the supplemental processing information needed in order to achieve a correct media presentation.

The pseudo-identifier and the co-organization of the pseudo-identifier and the supplemental processing information in the file according to the embodiments solve this problem with the prior art by triggering abortion or stop of the decoding of the encoded media content for those legacy media terminals that do not recognize the pseudo-identifier. This means that the media content is preferably never rendered at the legacy media terminal and the user can instead be informed that his/her media terminal does not support rendering of the present media content.

This concept is schematically illustrated to the right in FIG. 2. Thus, when a legacy media terminal, i.e. old terminal in the figure, receives the file with the pseudo-identifier and the supplemental processing information the legacy media terminal retrieves the pseudo-identifier. The media terminal then concludes that it does not recognize the pseudo-identifier and therefore stops the decoding of the media content.

In a particular embodiment, some additional or external information might be provided together with the file to enhance the self-awareness of the media terminal. Such meta information can, for instance, be a link to inform the media terminal that its decoder is out of date to decode the bit stream and that some update is needed. This is further illustrated in the figure, where the media terminal could search for codec updates in order to efficiently handle the file, recognize the pseudo-identifier and process decoded media content using the supplemental processing information. The media terminal can thereby be configured to request support or updates from some preconfigured external source.

The pseudo-identifier can therefore be thought of as a means for hiding the true codec identifier of the media codec from those legacy media terminals that will not recognize the supplemental processing information. The hiding of the codec identifier thereby prevents the legacy mobile terminals from decoding and thereby rendering the media content.

The co-organization of the pseudo-identifier and the supplemental processing information is preferably performed in such a way that the media terminal will only retrieve the supplemental processing information from the file if it recognizes and can interpret the pseudo-identifier. This effectively prevents legacy media terminals from trying to retrieve and interpret supplemental processing information that they do not recognize.

The embodiments will now be described further in connection with different particular implementation examples.

FIG. 3 is a flow diagram illustrating the co-organizing step in FIG. 1 according to a particular embodiment. The method continues from step S2 of FIG. 1. A next step S10 generates and provides a media container file. The media container file can be regarded as a complete input package that preferably comprises, in addition to the media content per se, information and instructions required by the media terminals for performing the decoding and rendering of the media content. The ISO base media file format can advantageously be employed as file format for the media container file, including various storage formats derived or based on the ISO base media file format, such as the AVC file format. The AVC file format in turn specifies how H.264 (MPEG-4 AVC) is carried in various file formats derived from the ISO base media file format, e.g. the MP4 and 3GP file format.

Figure 4:
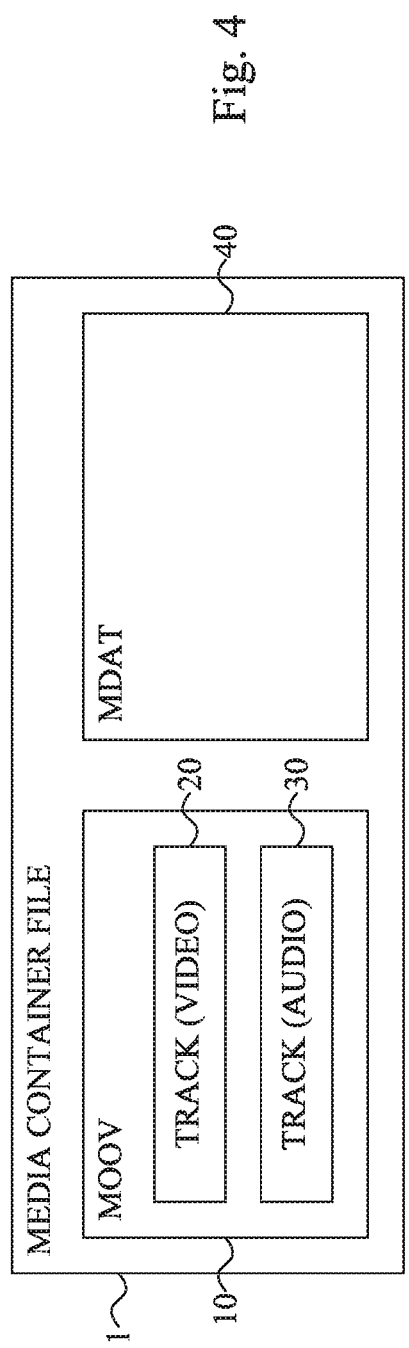
FIG. 4 is a schematic overview of a media container file according to an embodiment.

The media container file generated in step S10 comprises at least one media track defining the media content and at least one media content container or box comprising the encoded media content. An example of such a media container file 1 is illustrated in FIG. 4. The media container file 1 comprises, in this example, a respective media track 20, 30 for each media content to be rendered during a media presentation. Hence, a first media track 20 defines video content and a second media track 30 defines corresponding audio content. The media tracks 20, 30 are preferably organized in a movie ('moov') container or box 10, which is a container for the metadata relating to the media content. The figure also illustrates the media data ('mdat') container or box 40 that is the container for the actual media data for the media presentation.

A next step S11 of the method in FIG. 2 provides a sample entry box in the media container file. This sample entry box defines the pseudo-identifier. An example of such a sample entry box can look like:

```
class AVCSampleEntly ( ) extends VisualSampleEntry ('resv') {
    RestrictedSchemeInfoBox ( );
    AVCConfigurationBox config;
    MPEG4BitRateBox ( ); // optional
    MPEG4ExtensionDescriptionBox ( ); // optional
}
``` or more generally:

```
class RestrictedSampleEntry ( ) extends SampleEntry ('resv') {
    RestrictedSchemeInfoBox ( );
    ConfigurationBox config;
}
```

VisualSampleEntry and AVCSampleEntry define that the media content is video content. The sample entry box is designed in such a way that it has a virtual base: SampleEntry (format) extends Box (format). What is in the "format" field is undefined and is left to its derived entry to assign it a value. For instance, in the case of video we have VisualSampleEntry (codingname) extends SampleEntry (codingname). In the present case, "codingname" corresponds to 'resv' that represents the pseudo-identifier. Thus, instead of defining the particular media codec employed to encode the media content, such as 'avc1', the present embodiment replaces the codec identifier of the media codec with the pseudo-identifier 'resv'.

A supplemental processing information box is provided in the sample entry box in step S12. The supplemental processing information box comprises the supplemental processing information applicable to the media content. This supplemental processing information box can be arranged in the media container file according to various embodiments. In a first embodiment, the supplemental processing information box is provided directly in the sample entry box. The sample entry box can then be extended to read as, where SeiInformationBox corresponds to the supplemental processing information box:

```
class AVCSampleEntry ( ) extends VisualSampleEntry ('resv') {
    RestrictedSchemeInfoBox ( );
    AVCConfigurationBox config;
    SeiInformationBox seiinfo;
    MPEG4BitRateBox ( ); // optional
    MPEG4ExtensionDescriptionBox ( ); // optional
}
```

In an alternative embodiment, the supplemental processing information box is provided deeper in the restricted scheme information box instead of directly in the sample entry box. The restricted scheme information box could then be defined as:

```
aligned(8) class RestrictedSchemeInfoBox (fmt ) extends Box ('rinf')
{
    OriginalFormatBox (fmt) original_format;
    Scheme TypeBox scheme_type box; // optional
    SchemeInformationBox info;
}
```

In such a case, the supplemental processing information box can be contained in the scheme information box. The inclusion of the supplemental processing information box in the scheme information box could, in a particular embodiment, be conditional upon using 'aSEI', i.e. AVC SEI, as the scheme type.

In either case, the supplemental processing information box can, in a particular embodiment, be defined as:

```
aligned (8) class SeiInformationBox extends Box ('seii') {
    unsigned int(8) numRequiredSEIs;
    for (i=0; i<numRequiredSEIs; i++) {
        unsigned int(8) requiredSEI_ID;
    }
    unsigned int(8) numNotRequiredSEIs;
    for (i=0; i<numNotRequiredSEIs; i++) {
        unsigned int(8) NotrequiredSEI_ID;
    }
]
```

Thus, in this particular embodiment the supplemental processing information can be divided into mandatory supplemental processing information (requiredSEI_ID) that must be used by the media terminal during the post-decoding processing of the media content and optional supplemental processing information (NotrequiredSEI_ID). The latter is not mandatory but will generally improve or enhance the media presentation or the rendering of the media content if employed by the media terminal. numRequiredSEIs and numNotRequiredSEIs define the number of mandatory and optional supplemental processing information versions present in the media container file and relating to the particular media content. requiredSEI_ID takes on the value "payloadType" of a supplemental processing information message, such as SEI message, present in the media stream and that is deemed necessary by the file author or creator for correct rendering or playback. NotrequiredSEI_ID correspondingly takes on the value "payloadType" of a supplemental processing information message (SEI message) that is not deemed necessary by the file author for correct rendering.

The supplemental processing information box therefore preferably only comprises respective identifiers of the supplemental processing information messages that can be used in connection with the particular media content. The particular supplemental processing information messages referred to by these identifiers can then be provided elsewhere in the media container file, which is further described herein.

The next step S13 of FIG. 3 provides a media format box in the sample entry box. The media format box comprises the codec identifier of the media codec.

In a particular embodiment, the original sample entry type, i.e. codec identifier, is contained in an OriginalFormatBox, representing the media format box. The OriginalFormatBox can then be contained within the RestrictedSchemeInfoBox mentioned above:

```
aligned (8) class OriginalFormatBox (codingname) extends Box ('frma') {
    unsigned int(32) data_format; //value from the un-transformed sample entry, such as
    data_format =
    'avc1';
}
```

Thus, in the example above "data_format" represents the true media codec identifier and can take various values, such as 'avc1', 'mp4v', and so on depending on the particular media codec.

Figure 5:
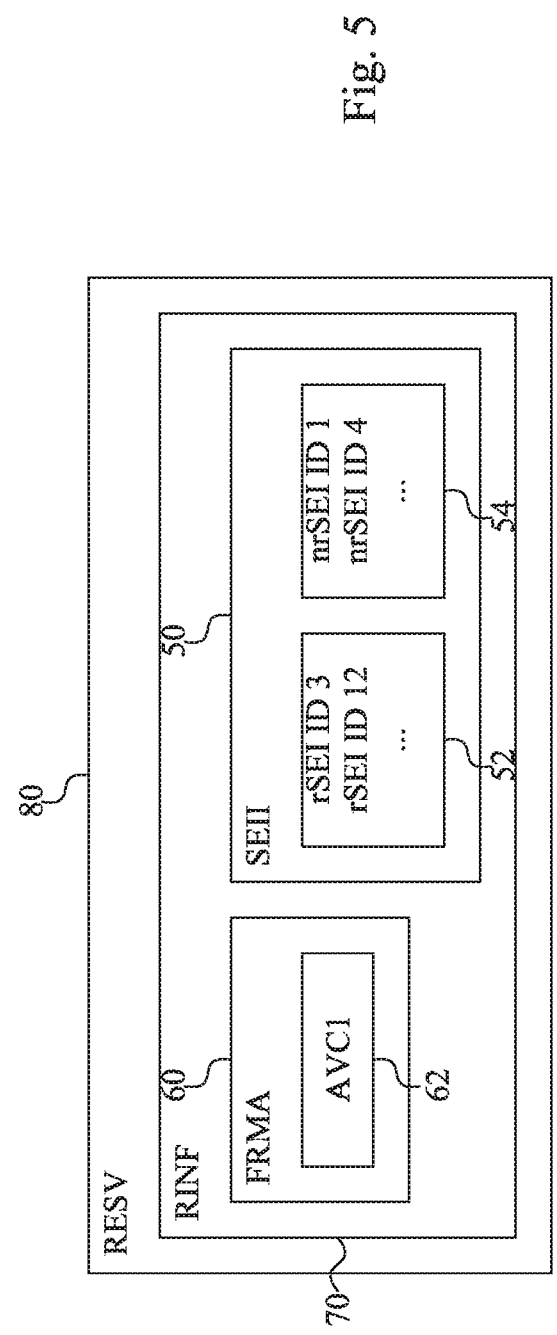
FIG. 5 is a schematic overview of a sample entry box according to an embodiment.

FIG. 5 schematically illustrates the various containers or boxes that can be used for defining the pseudo-identifier, the codec identifier and the supplemental processing information. In this particular embodiment, the sample entry box 80 has its traditional four-character-code, such as 'avc1', replaced by the pseudo-identifier represented by 'resv' in the figure denoting "restricted video". In this example, the sample entry box 80 in turn comprises, among others, the restricted scheme information box 70, denoted 'rinf' in the figure. The restricted scheme information box 70 comprises the original format box 60 (denoted Irma' in the figure) with the codec identifier 62, such as 'avc1'. In a particular embodiment, the restricted scheme information box 70 also comprises the supplemental processing information box 50 denoted 'seii' in the figure. The supplemental processing information box 50 comprises or lists the identifiers 52 of the required or mandatory supplemental processing information messages and the identifiers 54 of the not required or optional supplemental processing information messages.

Figure 6:
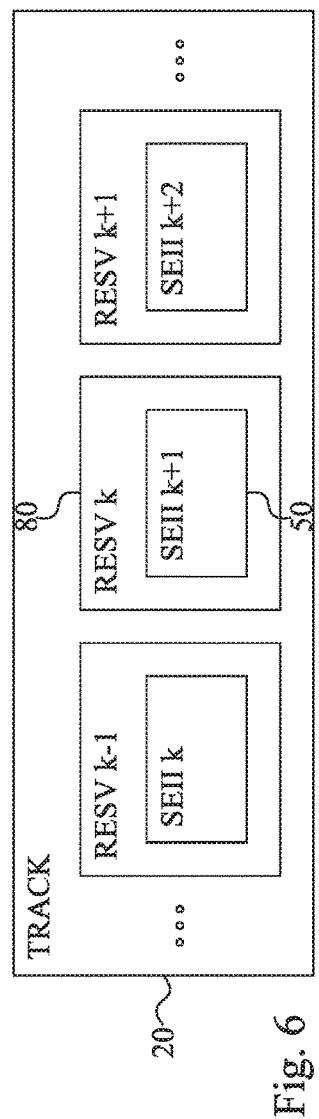
FIG. 6 is a schematic overview of an embodiment of organizing supplemental processing information in sample entry boxes of a media track.

FIG. 6 is a figure representing a media track 20 of the media container file. This figure illustrates that the media track 20 can be divided into multiple sample entry boxes 80, where each such sample entry box 80 is associated to a respective portion of the encoded media content contained in the media content box of the media container file. In such a case, the supplemental processing information 50 can be present in the sample entry boxes 80 as previously mentioned. In a particular embodiment, the supplemental processing information 50 defining post-decoding instructions applicable to a subsequent portion of the encoded media content is provided in a sample entry box associated with a previous portion of the encoded media content. This previous portion of the encoded content then has a decoding time preceding the decoding time of the subsequent portion of the encoded media content. Thus, the supplemental processing information 50 defining post-decoding instructions relating to media content portion k, k+1, k+2 is provided in the sample entry box 80 relating to media content portion k−1, k, k+1. In such a case, the media terminal will have time to identify and provide the supplemental processing information and its defined post-decoding instructions when the relevant media content version has been decoded by the media terminal. Thus, any delays been decoding and the post-decoding processing will therefore be reduced.

However, in most embodiments the sample entry boxes 80 and the media tracks 20 are typically sent together before the real data present in the media data container is transmitted. So for these embodiments, there is generally no need to provide supplemental processing information 50 defining post-decoding instructions relating to media content k in the sample entry box 80 relating to media content portion k−1. In clear contrast, the supplemental processing information 50 could instead be provided in the sample entry box relating to the media content portion k.

The actual post-decoding instructions defined by the supplementing processing information can be provided in the actual bit stream. Thus, the post-decoding instructions, such as SEI messages, can be encapsulated in NAL units and are then situated deep in the bit stream where they are contained by the media data box. Another place that the actual post-decoding instructions can be located is in some special box, e.g. ViewScalabilityInfoSEIBox that just makes a copy of the actual post-decoding instructions in the bit stream.

Further embodiments of the media container file could replace the traditional sample entry, such as AVC sample entry, in a way so that legacy media terminals will not be able to decode it. The new sample entry is then defined in a similar way to the original syntax but with addition of the supplemental processing information box. In such case, this new sample entry will correspond to the pseudo-identifier of the media codec. For instance, the sample entry box and the pseudo-identifier could be denoted 'avcr' for AVC with restrictions:

```
class AVCRestrictionsSampleEntry ( ) extends
VisualSampleEntry ('avcr') {
    AVCConfigurationBox config;
    SeiInformationBox seiinfo;
    MPEG4BitRateBox ( ); // optional
    MPEG4ExtensionDescriptorsBox ( ); // optional
}
```

In yet another embodiment, a new version of the AVC-DecoderConfigurationRecord is defined and hence a new value for configurationVersion in AVCDEcoderConfigurationRecord is used. This is done so that legacy media terminals that cannot use supplemental processing information will not be able to decode the file.

In an optional case, the new definition of AVCDecoderConfigurationRecord contains also information about the required and/or optional supplemental processing information. An example of this syntax is shown below:

```
aligned(8) class AVCDecoderConfigurationRecord {
    unsigned int(8) configuration Version = 2;
    unsigned int(8) AVCProfileIndication;
    unsigned int(8) profile_compatibility;
    unsigned int(8) AVCLevelIndication;
    bit(6) reserved = '111111'b;
    unsigned int(2) lengthSizeMinusOne;
    bit(3) reserved = '111'b;
    unsigned int(5) numOfSequenceParameterSets;
    for (i=0; i< numOfSequenceParameterSets; i++) {
        unsigned int(16) sequenceParameterSetLength ;
        bit(8*sequenceParameterSetLength) sequenceParameterSetNALUnit;
    }
    unsigned int(8) numOfPictureParameterSets;
    for (i=0; i< numOfPictureParameterSets; i++) {
        unsigned int(16) pictureParameterSetLength;
        bit(8*pictureParameterSetLength) pictureParameterSetNALUnit;
    }
    unsigned int(8) numRequiredSEIs;
    for (i=0; i<numRequiredSEIs; i++) {
        unsigned int(8) requiredSEI_ID;
    }
    unsigned int(8) numNotRequiredSEIs;
    for (i=0; i<numNotRequiredSEIs; i++) {
        unsigned int(8) NotrequiredSEI_ID;
    }
}
```

In an alternative embodiment, the file in which the pseudo-identifier and the supplemental processing information are co-organized is not necessary a media container file. FIG. 13 illustrates this embodiment. The method continues from step S2 of FIG. 1. A next step S50 involves generating a Session Description Protocol (SDP) file and co-organizing the pseudo-identifier and the supplemental processing information as different attribute lines in the SDP file. As is known in the art, Real-Transport Protocol (RTP) is designed for real time data transmission. Different payload formats are defined for different media codecs and these regulate the packetization rules. Side information is also typically sent in the SDP file between the sender and the receiver so that both parties are aware of the status of the media content being transmitted by establishing an SDP offer/answer model.

The SDP file can then be modified to have a first attribute line comprising the pseudo-identifier and a second attribute line comprising the supplemental processing information. Legacy media terminals that cannot utilize the supplemental processing information for post-decoding processing of the media content will not recognize the pseudo-identifier retrieved from the SDP file. Decoding of the media content is thereby stopped and prevented.

In a particular embodiment, the pseudo-identifier is used as a new type of brand name instead of the old brand name, such are replacing H264 by H264-RES, which means H.264 with restrictions. Also new stream property parameters are defined stating what restrictions are applied. These stream property parameters correspond to the supplemental processing information that can be specified as required/not required SEI messages. An example is shown below:

m=video 20000 RTP/AVP 97
a=rtpmap:97 H264-RES/90000
a=fmtp:97 sprop-requiredSEI-ID? {ID1},{ID2}; sprop-NotrequiredSEI-ID={ID3},{ID4},{ID5};

When a legacy media terminal receiver receives the SDP offer above, the pseudo-identifier H264-RES stop erroneous decoding since the legacy media terminal will reject this offer beforehand. Only media terminals that recognize H264-RES will accept the offer and can therefore correctly decode and render the media content with the supplemental processing information. These media terminals will, thus, map or translate the pseudo-identifier H264-RES to the codec identifier, i.e. H264. This means that these media terminals have been configured to understand the pseudo-identifier and conduct the required identifier mapping or translation.

The embodiments disclosed in the foregoing have mainly been exemplified with H.264/AVC. This should, however, merely be seen as illustrative but non-limiting examples. For instance, equivalent embodiments with extensions of H.264/AVC, such as Scalable Video Coding (SVC) and Multiview Video Coding (MVC), among others, work in a very similar manner by extending their specific configuration records and/or sample entry types in a similar way.

The embodiments therefore enable the detection of presence of supplemental processing information by a media terminal without examining the bit stream. In clear contrast, it is sufficient to investigate the relevant part of the media container file or the SDP file or offer as exemplified above. The supplemental processing information will furthermore advantageously only be seen by those media terminals that can interpret and use the supplemental processing information. A legacy media terminal will therefore not attempt to display a decoded bit stream that would have required additional post-processing before rendering.

Figure 7:
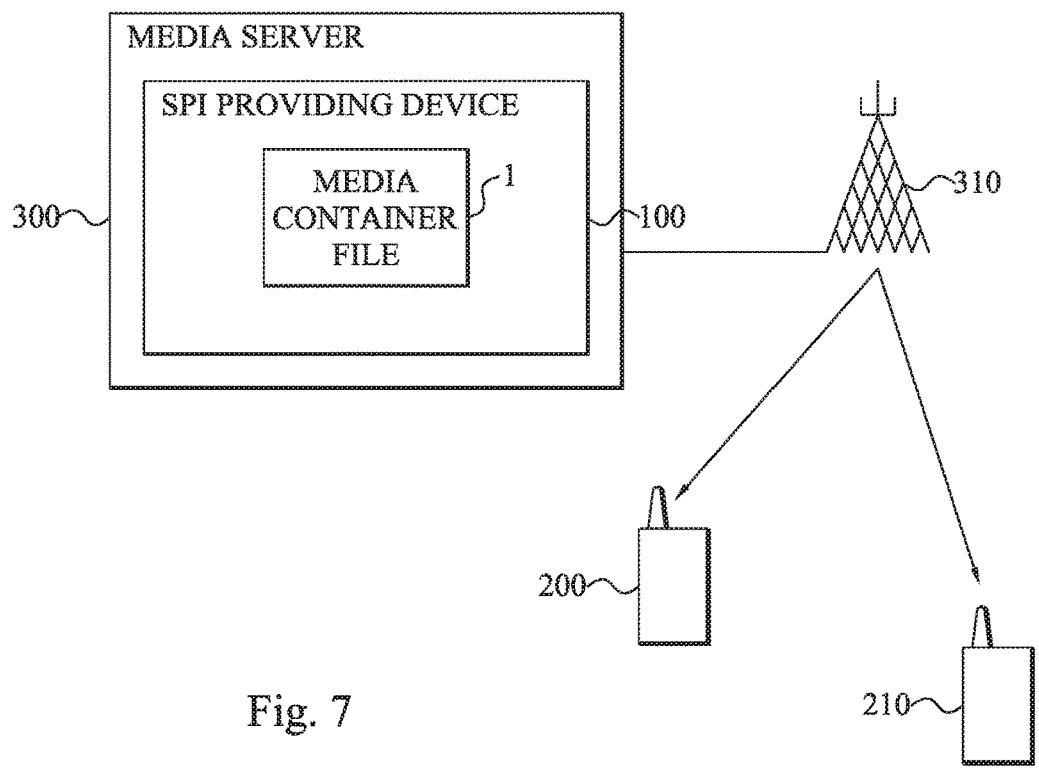
FIG. 7 is an overview of a communication network at which embodiments can be implemented.

FIG. 7 is a schematic overview of a portion of communication network, in which embodiments can be implemented. The communication network is exemplified by a radio-based communication network providing, among others, communication services to mobile terminals 200, 210 and other user devices, by means of base stations 310 or network nodes. The communication network also comprises a media server 300 implemented in or connected to such a base station 310 for providing media content to one or more requesting media terminals, such as the mobile terminals 200, 210. The figure illustrates one possible implementation embodiment of a device for providing supplemental processing information 100, denoted SPI providing device in the figures. This device 100 is configured to generate a file 1 as disclosed herein comprising the pseudo-identifier and the supplemental processing information. The file 1 is then transmitted to the mobile terminal 200, 210 by means of the connected base station 310. In the figure, the mobile terminal 210 could represent a legacy media terminal, whereas mobile terminal 200 indicates a media terminal that recognizes the pseudo-identifier and can use supplemental processing information.

The device 100 does not necessarily have to be implemented in the media server 300 but can alternatively be implemented in another network node of the communication network. A distributed implementation in multiple such network nodes is also possible and within the scope of the embodiments.

Figure 8:
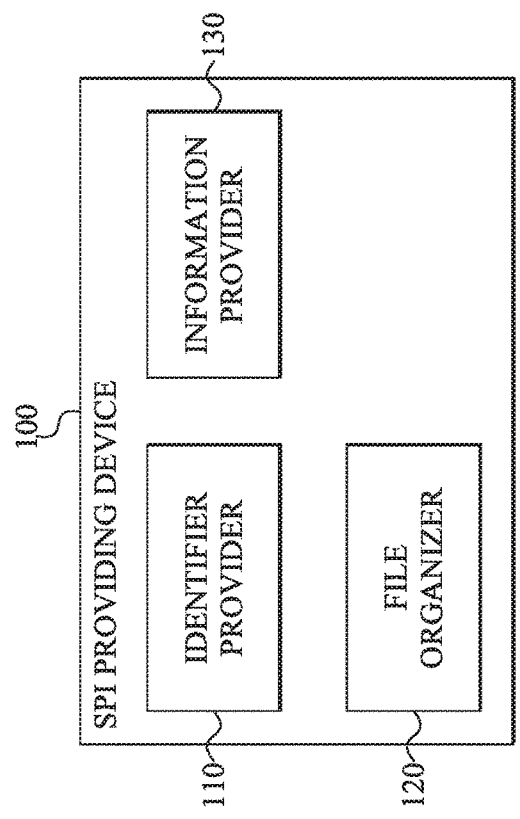
FIG. 8 is a schematic block diagram of a device for providing supplemental processing information according to an embodiment.

FIG. 8 is a schematic block diagram of the device for providing supplemental processing information 100 according to an embodiment. The device 100 comprises an identifier provider 110 configured to provide the pseudo-identifier of the media codec employed for encoding the media content. An information provider 130 is configured to provide the supplemental processing information representing post-decoding instructions for processing decoded media content obtainable by decoding the encoded media content. The device 100 also comprises a file organizer 120 configured to co-organize the pseudo-identifier from the identifier provider 110 and the supplemental processing information from the information provider 130 in a file. The co-organization in the file is, as has been disclosed herein, conducted by the file organizer 120 so that it triggers abortion of decoding of the encoded content by a legacy media terminal that does not recognize the pseudo-identifier. However, the co-organization enables decoding of the encoded media content using the media codec and enables post-decoding processing of the decoded media content using the supplemental processing information by a media terminal that recognizes the pseudo-identifier.

The information provider 130 could provide both required supplemental processing information representing mandatory post-decoding instructions for processing the decoded media content and non-required supplemental processing information representing optional post-decoding instructions for processing the decoded media content.

In a particular embodiment, the file organizer 120 is configured to generate a media container file comprising at least one media track defining the media content and at least one media content box comprising the encoded media content. The identifier provider 110 could then provide a sample entry box in the media container file. The sample entry box defines the pseudo-identifier and comprises a media format box comprising the codec identifier as previously described. The information provider 130 preferably provides a supplemental processing information box comprising the supplemental processing information in the sample entry box. In a particular embodiment, the information provider 130 provides the supplemental processing information defining post-decoding instructions applicable to a media content portion k in the sample entry box associated with a previous media content portion k−1 having a decoding time preceding the decoding time of the media content portion k. In another embodiment, the information provider 130 provides the supplemental processing information defining post-decoding instructions applicable to the media content portion k in the sample entry box associated with the media content portion k.

In an alternative embodiment, the file organizer 120 is configured to generate an SDP file comprising the pseudo-identifier from the identifier provider 110 as a first attribute line and the supplemental processing information from the information provider 130 as a second attribute line.

The units 110 to 130 of the device 100 may be implemented or provided as hardware or a combination of hardware and software. In the case of a software-based implementation, a computer program product implementing the device 100 or a part thereof comprises software or a computer program run on a general purpose or specially adapted computer, processor or microprocessor. The software includes computer program code elements or software code portions illustrated in FIG. 8. The program may be stored in whole or part, on or in one or more suitable non-transitory computer readable media or data storage means such as magnetic disks, CD-ROMs, DVD disks, USB memories, hard discs, magneto-optical memory, in RAM or volatile memory, in ROM or flash memory, as firmware, or on a data server.

The device 100 can advantageously be implemented in or in connection with a media server 300 as illustrated in FIG. 7.

Figure 9:
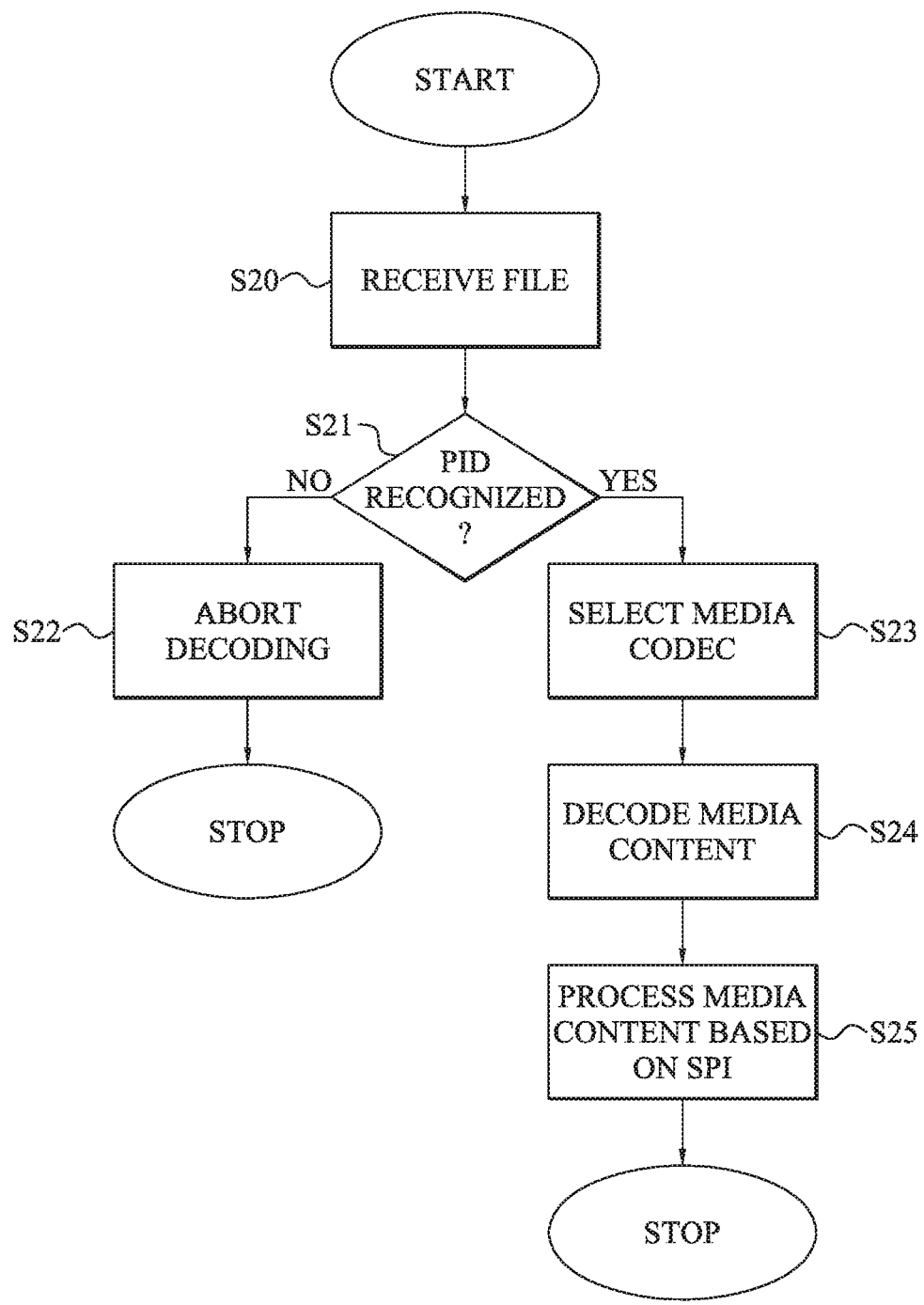
FIG. 9 is a flow diagram of a method of processing media content according to an embodiment.

FIG. 9 is a flow diagram illustrating a method of processing media content in a media terminal according to an embodiment. The method starts in step S20 where a file comprising the pseudo-identifier and the supplemental processing information is received. A next step S21 verifies whether the pseudo-identifier, abbreviated into PID in the figures, is recognizable. If the pseudo-identifier is not recognizable the method continues to step S22 where decoding of media content is aborted or prevented. As was discussed in the foregoing, the encoded media content can either be provided in the same file as the pseudo-identifier and the supplemental processing information or provided separately in step S20 or in another (not disclosed) step. If the pseudo-identifier instead is recognizable the method continues from step S21 to step S23. This step S23 selects a media codec for decoding the media content based on a codec identifier retrieved based on the pseudo-identifier. The next step S24 decodes the media content using the selected media codec. The decoded media content is processed in step S25 based on the supplemental processing information in order to get media content in a form suitable for rendering, such as display or playback.

The method could then end. Alternatively, media content could be divided into different media content portions where supplemental processing information could be associated with and applicable to different such media portions. In such a case, steps S24 and S25 are repeated for each such media content portion.

FIG. 10 is a flow diagram illustrating additional steps of the method in FIG. 9 according to an embodiment. The method continues from step S20 of FIG. 9, which involves receiving a media container file comprising at least one media track defining the media content, at least one media content box comprising the encoded media content and at least one sample entry box. The sample entry box defines the pseudo-identifier and comprises a supplemental processing information box with the supplemental processing information and a media format box with the codec identifier.

A next step S30 retrieves the pseudo-identifier from the sample entry box and investigates in step S21 of FIG. 9 if the pseudo-identifier is recognizable. If this is true the method continues to step S31, where the codec identifier is retrieved from the media format box. The method then continues to step S23 of FIG. 9, where the media codec is selected based on the retrieved codec identifier.

Figure 11:
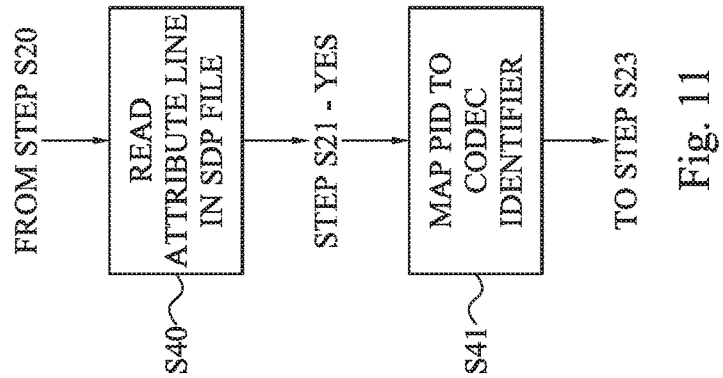
FIG. 11 is a flow diagram of additional steps of the method in FIG. 9 according to another embodiment.

FIG. 11 is a flow diagram illustrating additional steps of the method in FIG. 9 according to another embodiment. The method continues from step S20 in FIG. 9, which involves receiving an SDP file comprising a first attribute line comprising the pseudo-identifier and a second attribute line comprising the supplemental processing information. A next step S40 reads the first attribute line in the SDP file to identify the pseudo-identifier. The method then continues to step S21 in FIG. 9 to investigate whether the pseudo-identifier is recognizable. If this is true the method continues to step S41. Step S41 maps or translates the pseudo-identifier into the codec identifier. The method then continues to step S23 of FIG. 9, where the media codec is selected based on the mapped codec identifier.

If the supplemental processing information defines post-decoding instructions that allows identification of which video frames that belong to a left view and which video frames belong to a right view of stereo or 3D rendering, the processing step in FIG. 9 could comprise identifying the video frames of the encoded video data corresponding to the left view and the video frames corresponding to the right view based on the supplemental processing information.

Figure 12:
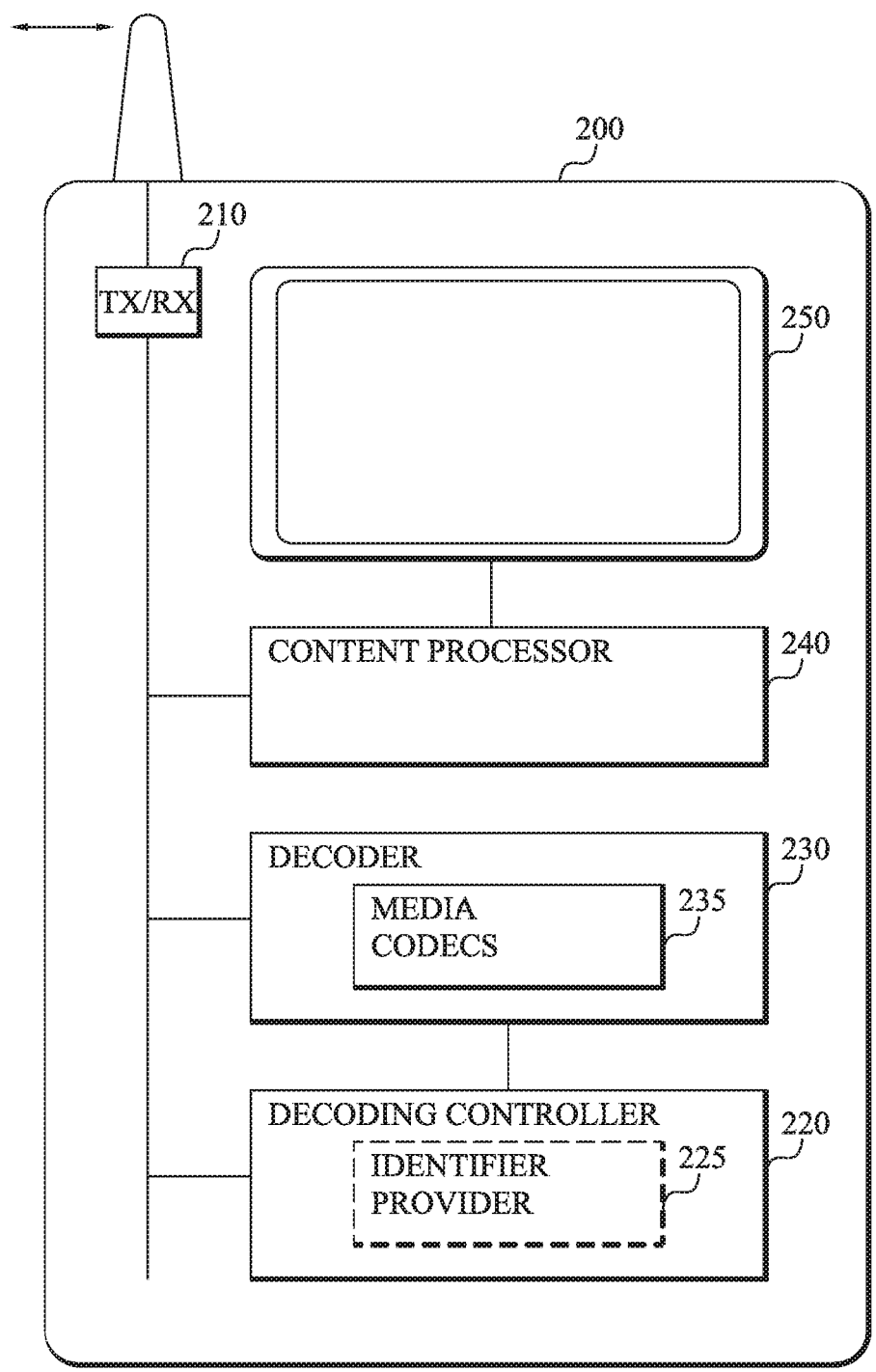
FIG. 12 is schematic block diagram of a media terminal according to an embodiment.

FIG. 12 is a schematic block diagram of a media terminal 200 according to an embodiment. The media terminal 200 is exemplified by a mobile terminal in the figure. However, this should merely be seen as an illustrative example. Media terminal could be any entity or device or aggregation of multiple devices that has decoding and rendering capability. A single such device could be a mobile terminal, such as mobile telephone or laptop, a computer, a set top box for a TV or any other media processing device. The decoding and rendering functionality can be present in different devices that are then capable of conducting wired or wireless communication with each other. Media terminal therefore also encompasses such a distributed implementation embodiment.

The media terminal 200 comprises a receiver 210 exemplified by a transceiver (TX/RX) in the figure. The receiver 210 is configured to receive a file comprising the pseudo-identifier and the supplemental processing information. A decoding controller 220 is configured to retrieve the pseudo-identifier from the file and verify whether the pseudo-identifier is recognizable. If it is not recognized by the decoding controller 220, the decoding controller 220 controls the decoder 230 to abort the decoding of the encoded media content or stops the decoder 230 from starting with the decoding process. If the decoding controller 220 instead recognizes the pseudo-identifier it selects the media codec 235 to use by the decoder 230 for decoding the media content. This codec selection is conducted based on a codec identifier determined by the decoding controller 220 using the pseudo-identifier.

The decoder 230 then decodes the encoded media content using the selected media codec 235 to get decoded media content. The decoded media content is further processed by a content processor 240 based on the supplemental processing information retrieved from the file to get media content in a form suitable for rendering. The media terminal 200 could then have a media player (not illustrated) that renders the processed media content for display on a display screen 250. Alternatively or in addition, the media player could play back audio content on a loudspeaker (not illustrated) of the media terminal 200.

In a particular embodiment, the receiver 210 receives a media container file with at least one media track defining the media content, at least one media content box comprising the media content and preferably the post-decoding instructions defined by the supplemental processing information. At least one sample entry box is also included in the media container file and defines the pseudo-identifier and comprises the supplemental processing information box with the supplemental processing information and the media format box with the codec identifier. In such a case, the media terminal 200 preferably comprises an identifier provider 225 configured to retrieve the pseudo-identifier from the sample entry box. The identifier provider 225 preferably also retrieves, if the pseudo-identifier is recognizable by the decoding controller 220, the codec identifier from the media format box.

In an alternative embodiment, the receiver 210 receives an SDP file comprising a first attribute line comprising the pseudo-identifier and a second attribute line comprising the supplemental processing information. The identifier provider 225 is then configured to read the first attribute line to retrieve the pseudo-identifier and then, if the pseudo-identifier is recognizable by the decoding controller 220, map the pseudo-identifier to the codec identifier of the media codec 235 using preconfigured mapping data stored in the media terminal 200. Such preconfigured mapping data could be a list comprising the pseudo-identifiers that are recognized by the decoding controller 220 and the matching codec identifiers.

The units 210 to 240 of the media terminal 200 may be implemented or provided as hardware or a combination of hardware and software. In the case of a software-based implementation, a computer program product implementing the media terminal 200 or a part thereof comprises software or a computer program run on a general purpose or specially adapted computer, processor or microprocessor. The software includes computer program code elements or software code portions illustrated in FIG. 12. The program may be stored in whole or part, on or in one or more suitable non-transitory computer readable media or data storage means such as magnetic disks, CD-ROMs, DVD disks, USB memories, hard discs, magneto-optical memory, in RAM or volatile memory, in ROM or flash memory, as firmware, or on a data server.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

What is claimed is:

1. A method of providing supplemental processing information relating to encoded media content, the method comprising:
    generating media content comprising:
        an alias for a media codec employed to encode the media content; and
        supplemental processing information defining post-decoding instructions for processing the media content; and
    sending the media content to a receiving device, wherein the alias triggers the receiving device to abort decoding the media content when the receiving device does not recognize the alias.

2. The method of claim 1 wherein, when the receiving device does recognize the alias, the alias triggers the receiving device to:
    decode the encoded media content using the media codec; and
    implement post-decoding processing of the decoded media content using the supplemental processing information.

3. The method of claim 1 wherein generating the media content comprises:
 generating a media container file to comprise:
  at least one media track defining the media content;
  at least one media data box comprising the encoded media content; and
  a sample entry box defining the alias and comprising:
   a supplemental processing information box comprising the supplemental processing information; and
   a media format box comprising a codec identifier of the media codec.

4. The method of claim 3:
 wherein the media track comprises multiple sample entry boxes, each sample entry box being associated with a respective portion of the encoded media content in the at least one media data box;
 wherein the supplemental processing information box defines post-decoding instructions that are applicable to a subsequent portion of the encoded media content in a sample entry box associated with a previous portion of the encoded media content; and
 wherein the sample entry box associated with the previous portion of encoded media content has a decoding time that precedes a decoding time of the subsequent portion of the encoded media content.

5. The method of claim 3 wherein generating the media container file comprises generating a session description protocol file comprising:
 a first attribute line comprising the alias for the media codec; and
 a second attribute line comprising the supplemental processing information.

6. The method of claim 1 further comprising generating the supplemental processing information, wherein the supplemental processing information comprises at least one of:
 supplemental processing information representing mandatory post-decoding instructions for processing the decoded media content; and
 supplemental processing information representing optional post-decoding instructions for processing the decoded media content.

7. The method of claim 1 wherein the encoded media content comprises encoded video data, and further comprising generating the supplemental processing information, wherein the supplemental processing information represents post-decoding instructions defining which video frames of the encoded video data that correspond to a left view and which video frames of the encoded video data that correspond to a right view for three dimensional rendering of the video data.

8. An apparatus configured to provide supplemental processing information related to encoded media content, the apparatus comprising:
 a processing circuit configured to:
  generate media content comprising:
   an alias for a media codec employed to encode the media content, wherein the alias triggers a device receiving the media content to abort decoding the media content when the device does not recognize the alias; and
   supplemental processing information defining post-decoding instructions for processing the media content; and
 a communication circuit operatively connected to the processing circuit, and configured to send the media content to the device.

9. The apparatus of claim 8 wherein when the media content is received by a device that does recognize the alias, the alias triggers the device to:
 decode the encoded media content using the media codec; and
 implement post-decoding processing of the decoded media content using the supplemental processing information.

10. The apparatus of claim 8 wherein to generate the media content, the processing circuit is configured to generate a media container file to comprise:
 at least one media track defining the media content;
 at least one media data box comprising the encoded media content; and
 a sample entry box defining the alias and comprising:
  a supplemental processing information box comprising the supplemental processing information; and
  a media format box comprising a codec identifier of the media codec.

11. The apparatus of claim 10:
 wherein the media track comprises multiple sample entry boxes, each sample entry box being associated with a respective portion of the encoded media content in the at least one media data box;
 the processing circuit is configured to generate the supplemental processing information box defining post-decoding instructions that are applicable to a subsequent portion of the encoded media content in a sample entry box associated with a previous portion of the encoded media content; and
 wherein the sample entry box associated with the previous portion of encoded media content has a decoding time that precedes a decoding time of the subsequent portion of the encoded media content.

12. The apparatus of claim 8 wherein to generate the media container file, the processing circuit is configured to generate a session description protocol file comprising:
 a first attribute line comprising the alias; and
 a second attribute line comprising the supplemental processing information.

13. The apparatus of claim 8 wherein the supplemental processing information comprises at least one of:
 supplemental processing information representing mandatory post-decoding instructions for processing the decoded media content; and
 supplemental processing information representing optional post-decoding instructions for processing the decoded media content.

14. The apparatus of claim 8 wherein the apparatus comprises a media server.

15. The apparatus of claim 14 wherein the media server comprises a network node.

16. A method of processing media content, the method comprising:
 obtaining an encoded version of media content to decode, wherein the media content comprises an alias of a media codec used to encode the media content;
 responsive to recognizing the alias, decoding the encoded version of the media content using supplemental processing information included in the media content, wherein the supplemental information defines post-decoding instructions for processing the media content; and
 responsive to not recognizing the alias, aborting decoding the encoded version of the media content.

17. The method of claim 16 wherein, responsive to recognizing the alias, decoding the encoded version of the media content comprises:
  selecting the media codec for decoding the encoded version of the media content based on a codec identifier of the media codec;
  decoding the encoded version of the media content using the selected media codec; and
  processing the decoded media content based on the supplemental processing information retrieved from the media container file to place the media content in a form suitable for rendering.

18. The method of claim 17 wherein the media content is video data, and wherein processing the decoded media content comprises identifying, based on the supplemental processing information, which video frames of the encoded video data correspond to a left view and which video frames of the encoded video data correspond to a right view for three dimensional rendering of the video data.

19. The method of claim 16 wherein obtaining an encoded version of media content to decode comprises obtaining a media container file, the media container file comprising:
  at least one media track defining the media content;
  at least one media data box comprising the encoded version of the media content; and
  a sample entry box defining the alias and comprising a supplemental processing information box and a media format box, wherein the supplemental processing information box comprises the supplemental processing information, and wherein the media format box comprises the codec identifier.

20. The method of claim 19 further comprising:
  retrieving the alias from the sample entry box; and
  retrieving the codec identifier from the media format box responsive to recognizing the retrieved alias.

21. The method of claim 19 wherein the media container file comprises a session description protocol file comprising a first attribute line comprising the alias and a second attribute line comprising the supplemental processing information, and wherein the method further comprises:
  reading the first attribute line in the session description protocol file to retrieve the alias; and
  mapping the alias to the codec identifier responsive to recognizing the retrieved alias.

22. An apparatus comprising:
  a receiver configured to receive an encoded version of media content comprising an alias of a media codec used to encode the media content;
  a decoder operatively connected to the receiver and configured to:
    decode the encoded version of the media content using supplemental processing information included in the encoded version of the media content responsive to recognizing the alias, wherein the supplemental information defines post-decoding instructions for processing the media content; and
    abort decoding the encoded version of the media content responsive to not recognizing the alias.

23. The apparatus of claim 22 wherein responsive to recognizing the alias, the decoder is further configured to:
  select the media codec to decode the encoded version of the media content based on a codec identifier of the media codec; and
  decode the encoded version of the media content using the selected media codec.

24. The apparatus of claim 23 further comprising a content processing circuit, and wherein responsive to the alias being recognized, the content processing circuit is configured to process the media content based on the supplemental processing information retrieved from the encoded version of the media content to obtain the media content in a form suitable for rendering.

25. The apparatus of claim 22 wherein to receive an encoded version of media content, the receiver is configured to receive a media container file comprising:
  at least one media track defining the media content;
  at least one media data box comprising the encoded version of the media content;
  a sample entry box defining the alias and comprising a supplemental processing information box and a media format box, wherein the supplemental processing information box comprises the supplemental processing information, and wherein the media format box comprising the codec identifier.

26. The apparatus of claim 25 further comprising an identifier provider circuit configured to:
  retrieve the alias from the sample entry box; and
  retrieve the codec identifier from the media format box responsive to the alias being recognized.

27. The apparatus of claim 22 wherein the apparatus comprises a media terminal.

28. The apparatus of claim 22 wherein the receiver is further configured to receive a session description protocol file comprising a first attribute line comprising the alias and a second attribute line comprising the supplemental processing information, and wherein the apparatus further comprises an identifier provider configured to:
  read the first attribute line in the session description file to retrieve the alias; and
  map the alias to the codec identifier responsive to recognizing the alias.

* * * * *

UNITED STATES PATENT AND TRADEMARK OFFICE
CERTIFICATE OF CORRECTION

PATENT NO. : 10,397,595 B2
APPLICATION NO. : 16/102404
DATED : August 27, 2019
INVENTOR(S) : Fröjdh et al.

Page 1 of 1

It is certified that error appears in the above-identified patent and that said Letters Patent is hereby corrected as shown below:

In the Specification

In Column 1, Line 8, delete "2017," and insert -- 2017, which issued as U.S. Pat. No. 10,085,036, --, therefor.

In Column 8, Line 1, delete "AVCSampleEntly" and insert -- AVCSampleEntry --, therefor.

In Column 10, Line 6, delete "Irma'" and insert -- 'frma' --, therefor.

In Column 11, Line 31, delete "configuration version" and insert -- configurationversion --, therefor.

Signed and Sealed this
Fourth Day of February, 2020

Andrei Iancu
*Director of the United States Patent and Trademark Office*